(12) United States Patent
Cina

(10) Patent No.: US 7,360,161 B2
(45) Date of Patent: Apr. 15, 2008

(54) REFRESHING A TRANSACTION SCREEN

(75) Inventor: Miroslav Cina, Ratingen (DE)

(73) Assignee: SAP Aktiengesellschaft, Walldorf (DE)

( * ) Notice: Subject to any disclaimer, the term of this patent is extended or adjusted under 35 U.S.C. 154(b) by 725 days.

(21) Appl. No.: 10/734,511

(22) Filed: Dec. 12, 2003

(65) Prior Publication Data
US 2005/0132302 A1    Jun. 16, 2005

(51) Int. Cl.
*G06F 3/00* (2006.01)

(52) U.S. Cl. .................... 715/744; 715/700; 715/736; 715/867; 713/300

(58) Field of Classification Search ............. 715/744, 715/736
See application file for complete search history.

(56) References Cited

U.S. PATENT DOCUMENTS

| | | | |
|---|---|---|---|
| 6,374,145 B1 * | 4/2002 | Lignoul | 700/17 |
| 6,404,447 B1 * | 6/2002 | Kitagawa | 715/867 |
| 6,516,421 B1 * | 2/2003 | Peters | 713/502 |
| 6,560,711 B1 * | 5/2003 | Given et al. | 726/34 |
| 6,839,686 B1 * | 1/2005 | Galant | 705/36 R |
| 6,973,623 B2 * | 12/2005 | Little et al. | 715/760 |
| 7,089,508 B1 * | 8/2006 | Wright | 715/867 |
| 2003/0076341 A1 * | 4/2003 | Kuki | 345/700 |
| 2003/0182220 A1 * | 9/2003 | Galant | 705/36 |
| 2004/0181578 A1 * | 9/2004 | Elms | 709/205 |
| 2004/0248637 A1 * | 12/2004 | Liebenberg et al. | 463/16 |
| 2005/0057560 A1 * | 3/2005 | Bibr et al. | 345/418 |

* cited by examiner

*Primary Examiner*—Sy D Luu
(74) *Attorney, Agent, or Firm*—Fish & Richardson P.C.

(57) ABSTRACT

Methods and apparatus, including computer program products, implementing techniques for refreshing a transaction screen. The techniques include displaying a transaction screen containing data for a transaction, waiting to receive user input to the transaction screen, and automatically refreshing the screen with updated data if user input is not received within a pre-determined period of time.

15 Claims, 6 Drawing Sheets

MODULE set_restart OUTPUT.
    CALL FUNCTION 'CRM_MONITOR_I02_WAIT'
      starting new task 'MON02_RST'
      performing restart_receive on end of task
      EXPORTING

┌── 610
        | I_SEC      = 1. |

ENDMODULE.                "set_restart OUTPUT

FIG. 6

FUNCTION CRM_MONITOR_I02_WAIT.
*"----------------------------------------------------------------
*"*"Lokale Schnittstelle:
*"    IMPORTING
*"        VALUE(I_SEC) TYPE I DEFAULT 1
*"    EXPORTING
*"        VALUE(E_DUMMY) TYPE I
*"---------------------------------------------------------------- wait up to i_sec seconds.
  e_dummy = 1.

ENDFUNCTION.

FIG. 7

```
FORM restart_receive using taskname.
    data: 1v_dummy.
        RECEIVE RESULTS FROM FUNCTION 'CRM_MONITOR_I02_WAIT'
            importing
                    e_dummy = 1v_dummy
            exceptions
                    SYSTEM_FAILURE          = 1
                    COMMUNICATION_FAILURE = 2
                    others                  = 4.
        gv_subrc = sy-subrc.
        set user-command 'SCUL'
ENDFORM.                                " restart_receive
```

REFRESHING A TRANSACTION SCREEN

BACKGROUND

The present invention relates to data processing by digital computer, and more particularly to refreshing a transaction screen.

In the context of database processing, a transaction is a set of actions that either commits (i.e., all the actions occur) or aborts (i.e., all the actions are undone). In many systems, a user can create a transaction by viewing and providing data for the transaction in a transaction screen (displayed on a display device, e.g., a computer monitor) using a keyboard, mouse, or other data entry devices. Over time, the data displayed on the transaction screen may become invalid or incorrect as a result of other processes that are occurring at the same time.

To update the displayed data, users can manually trigger a screen refresh, for example, by clicking on a refresh button that is included as part of the transaction screen.

SUMMARY OF THE INVENTION

The present invention provides methods and apparatus, including computer program products, implementing techniques for refreshing a transaction screen. The techniques include displaying a transaction screen containing data for a transaction, waiting to receive user input to the transaction screen, and automatically refreshing the screen with updated data if user input is not received within a pre-determined period of time.

Implementations of the invention can include one or more of the following features:

Refreshing the screen if user input is not received within a pre-determined period of time comprises starting a timer that times out after a pre-determined period of time has lapsed, once the timer times out, simulating user input requesting that the screen be refreshed; and refreshing the screen with updated data in response to the simulated user input.

The data processing apparatus includes a client and a server; displaying a transaction screen is performed by the client; and simulating user input is performed by the server. The server is a transaction processing application whose execution involves multiple phases including: a first phase that involves displaying a transaction screen, a second phase that involves waiting for user interaction with the transaction screen, and a third phase that involves processing user interaction with the transaction screen.

The invention can be implemented to realize one or more of the following advantages. A screen can be refreshed automatically. Input help can be provided automatically. One implementation of the invention provides all of the above advantages.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

FIG. 6 is an example of code invoking the timer.

FIG. 7 is an example of code for the timer.

Like reference numbers and designations in the various drawings indicate like elements.

DETAILED DESCRIPTION

Figure 1:
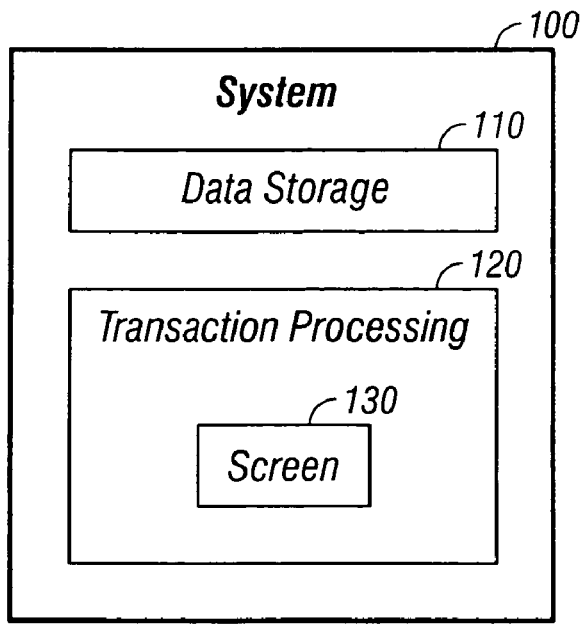
FIG. 1 is a block diagram of a system in accordance with the invention.

As shown in FIG. 1, a system 100 in accordance with the invention includes a data storage module 110 for storing data and a transaction processing module 120 for processing transactions involving the stored data. Users can view data for the transaction and provide input to the transaction through a transaction screen 130.

Figure 2:
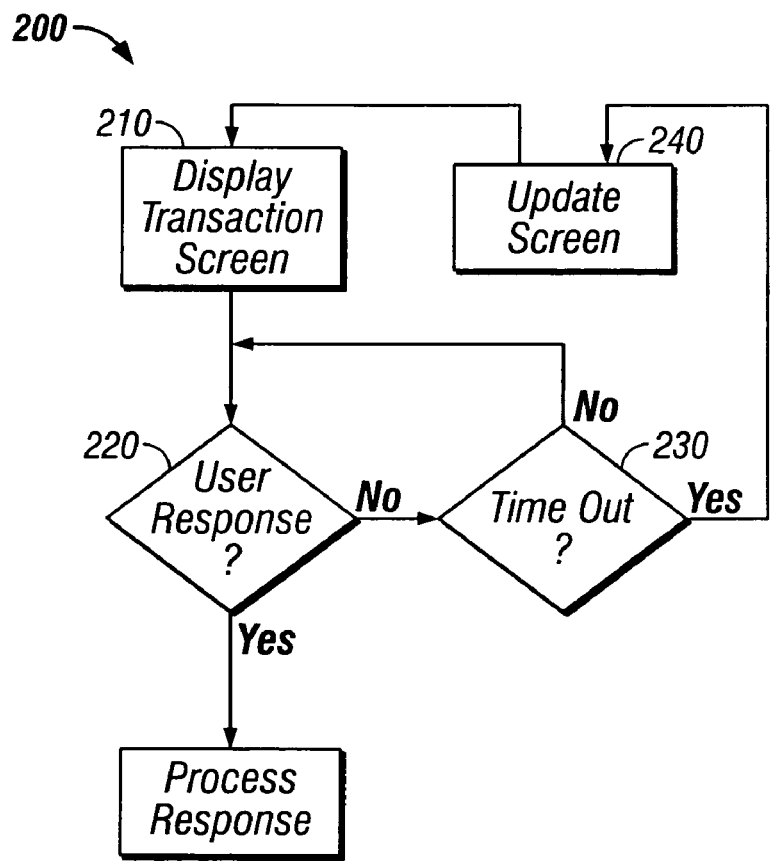
FIG. 2 is a flow diagram of the system operation.

As shown in FIG. 2, in a method 200 of processing of a transaction, the transaction processing module displays a transaction screen containing data for the transaction (step 210) and then waits for the user to respond (step 220). In some cases, the nature of what is displayed to the user is something that requires a user response. For example, to process a sales transaction, the transaction processing module displays a sales catalog and then waits for the user to select one or more items from the sales catalog.

While the transaction processing module is waiting for the user response, the data may have become invalid or incorrect. To keep the transaction screen current, the transaction processing module keeps track of how long it has been waiting for a response (step 230). If it does not receive a response within a pre-determined period of time, the transaction processing module automatically refreshes the transaction screen by re-displaying the screen with updated data (steps 240 and 210).

Figure 3A:
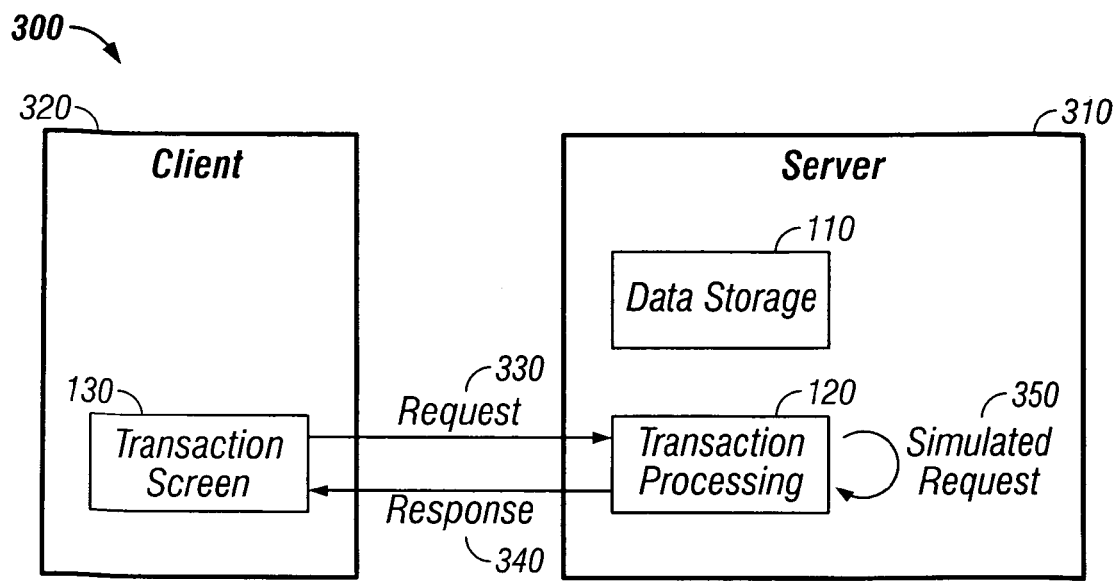
FIGS. 3A and 3B are examples of a client-server implementation of the system.

In one implementation, illustrated in FIG. 3A, the system 100 is a client-server system 300 that includes a back-end (server) component 310 and a front-end (client) component 320. The client and the server communicate using a request and response protocol where the client sends a request 330 to the server and the server sends a response 340 back to the client. Typically, the client and server are executed on separate computers, although in some instances the client and server may be executed on the same computer.

In such an implementation, the data storage module 110 and the transaction processing module 120 run on the server while the transaction screen is displayed on the client. The client displays the transaction screen 130 based on instructions it receives from server. The client then waits for user interaction with the transaction screen. User interaction with the transaction screen causes a request to be generated on the client and sent to the server.

If the server does not receive a request from the client for a pre-determined period of time after it has sent the instructions for displaying the transaction screen, the server generates a simulated client request 350 and then responds to that request by sending the client a new transaction screen with updated data (if there has been any change in the data) or with the same data (if no change in the data).

Figure 3B:
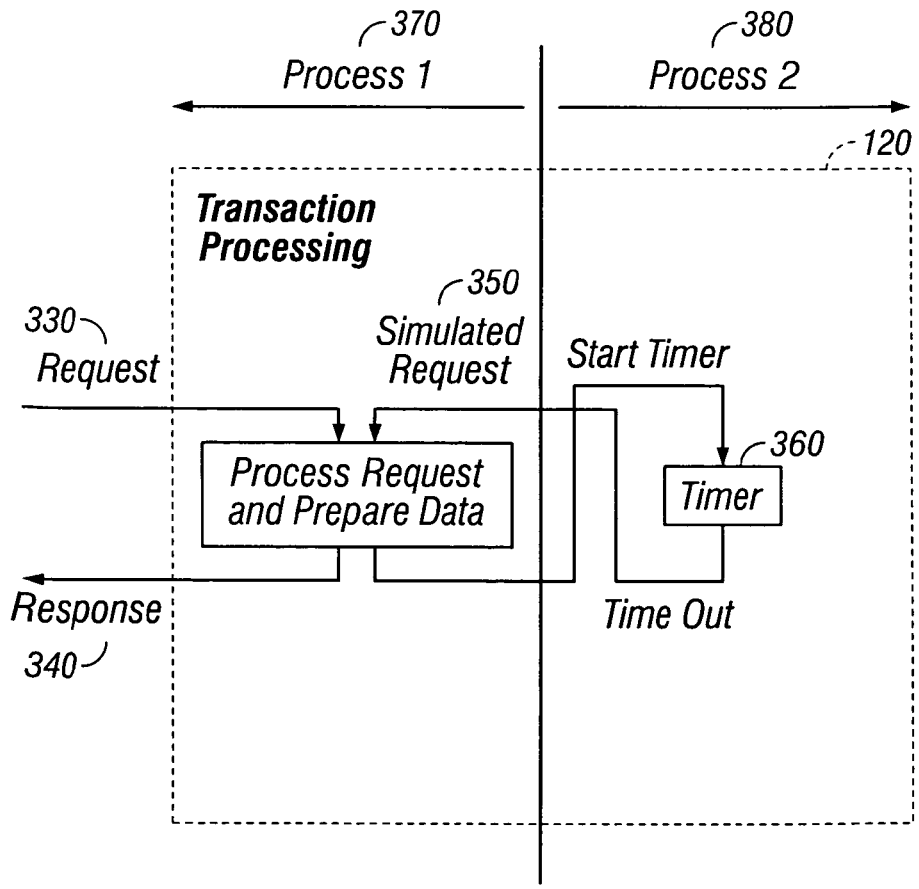
Figure 4:
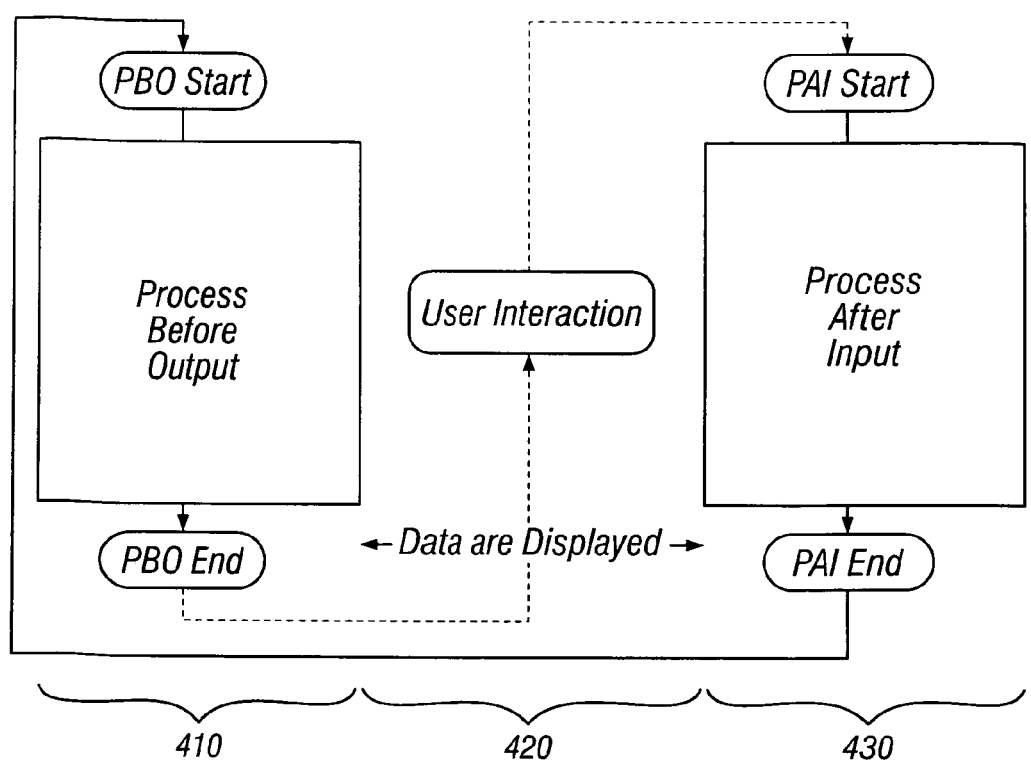
FIGS. 4 and 5 are examples of a Dynpro implementation of the system.

In one implementation, illustrated in FIG. 3B, the server uses a timer mechanism 360 to determine when to generate the simulated client request 350. The timer mechanism 360 runs in a separate thread 380 or process from the main transaction processing thread 370. When the timer times out, the timer thread 380 expires and the simulated client request 350 is generated in the main transaction processing thread 370.

In one implementation, the above-described client-server system 300 is an R/3 system available from SAP AG, of Walldorf (Baden) Germany, and the transaction processing module is a Dynpro application. A Dynpro, or dynamic program, is an R/3 screen and its associated processing logic.

The processing involves multiple phases. The first phase 410, Process before Output (PBO), occurs before the transaction screen is displayed and ends when the transaction screen is displayed. During the PBO phase, the screen is initialized with the data to be displayed. The second phase 420, waiting phase, is the phase where the Dynpro application is waiting to receive a user response. Upon receiving a user response, the processing enters the third phase 430, Process After Input (PAI). During the PAI phase, the user response is processed and when the PAI is finished, the PBO phase is started again. This cycle is repeated until the Dynpro terminates.

Figure 5:
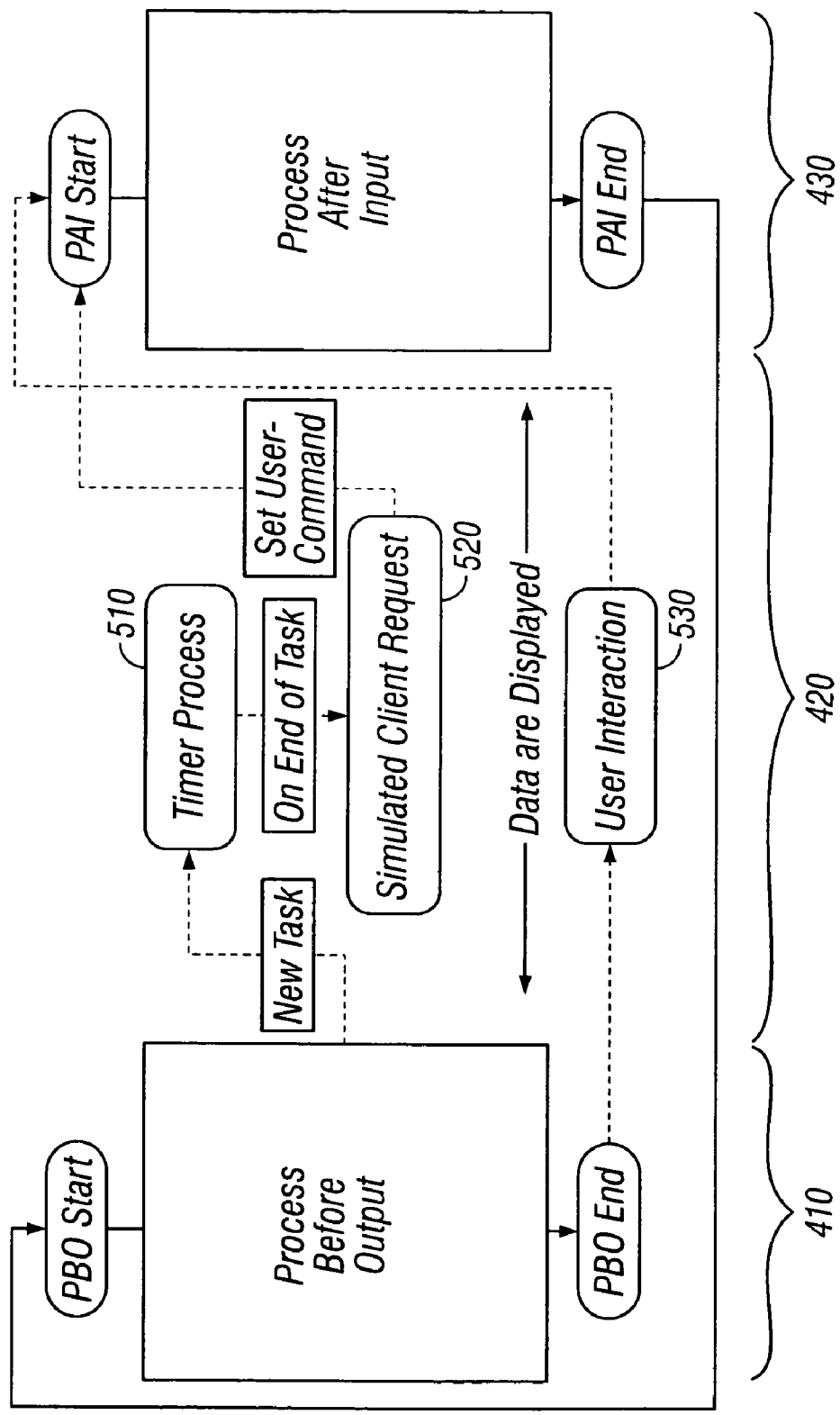

The above-described auto-refresh technique is performed by the Dynpro application as follows. Before the PBO phase terminates, the Dynpro application initiates a timer process 510 (FIG. 5) that runs in a separate thread from the main thread within which the Dynpro application is executing. The timer runs for a pre-determined period of time and then terminates. The Dynpro application sets the duration of the timer when it initiates the timer process.

FIG. 6 shows example code for invoking the timer process 510. FIG. 7 shows example code for the timer process 510. In the example code, the function "CRM_MONITOR_I02_WAIT" represents the timer process 510 and the variable "i_sec" 610 represents the duration of the timer.

After the timer process 510 has terminated, the Dynpro application generates a simulated client request 520 for a screen refresh. The simulated user request 520 causes the Waiting phase 420 to end and the PAI phase 430 to begin. During the PAI phase 430, the Dynpro application processes the simulated screen refresh request in the same manner as an actual request from the user. After processing, the Dynpro application enters the PBO phase 410 again and displays the transaction, this time with updated data.

Figures 8, 9:
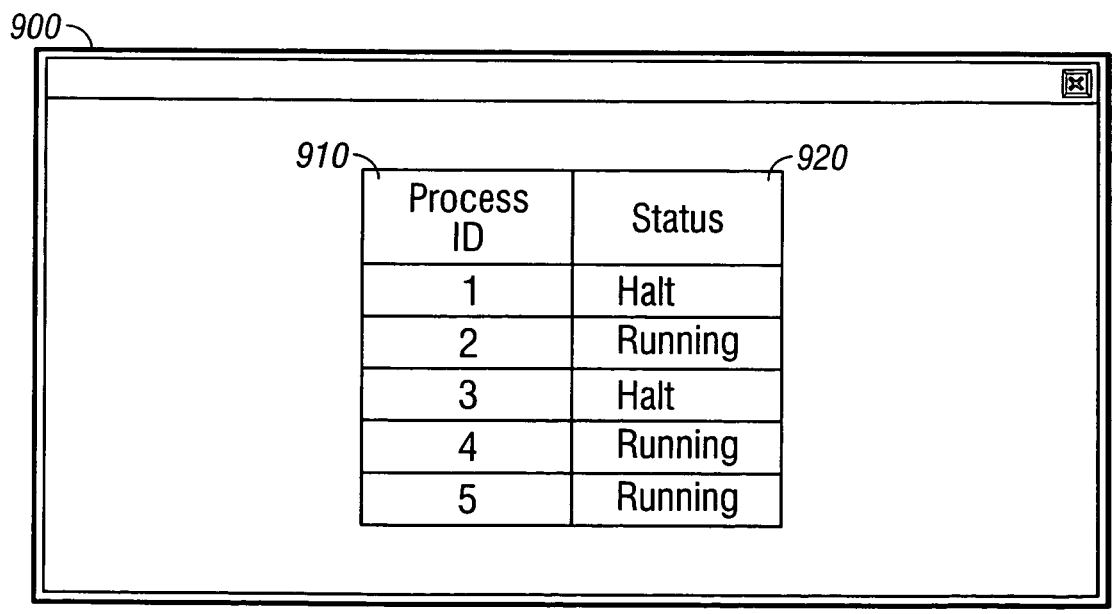
FIG. 8 is an example of code for simulating a user request.
FIG. 9 is an example of a screen for a process monitoring transaction.

FIG. 8 shows example code for the simulated client request 520. In the example code, the form "restart_receive" represents the simulated client request.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention is not limited to the particular embodiments described. For example, although the invention has been described in terms of its use in a transaction processing system, its use is not limited to such system. For example, it can be used to refresh automatically the screen of a process monitoring program. One such screen 900 is shown in FIG. 9. The screen 900 displays data that lists the identity 910 and the status 920 of processes being monitored. The screen automatically updates the screen periodically to ensure that the displayed data remains current.

Furthermore, although the invention has been described as an auto-refresh technique, it has other applications as well. For example, it can be used to provide input help automatically to the user. If the user does not respond after a pre-determined period of time, the system automatically updates the screen to include help information that instructs the user what type of response is expected, or automatically updates the screen to include a default input which the user can accept or reject. Other embodiments are within the scope of the following claims.

What is claimed is:

1. A computer program product, tangibly embodied in a machine-readable storage device, the computer program product being operable to cause data processing apparatus comprising a client and a server to perform operations comprising:
   displaying on a display device of the client, a transaction screen received from the server, the transaction screen containing data for a transaction;
   waiting to receive user input to the transaction screen; and
   automatically refreshing the transaction screen on the client with updated data if user input to the transaction screen is not received by the server within a pre-determined period of time, wherein refreshing the transaction screen comprises:
      starting a timer that times out after a pre-determined period of time has lapsed;
      once the timer times out, simulating user input requesting that the transaction screen be refreshed, the simulating being performed by the server; and
      refreshing the transaction screen with updated data in response to the simulated user input.

2. The product of claim 1, wherein the server is a transaction processing application whose execution involves multiple phases including:
   a first phase that involves displaying a transaction screen;
   a second phase that involves waiting for user interaction with the transaction screen; and
   a third phase that involves processing user interaction with the transaction screen.

3. A method comprising:
   displaying on a display device of a client, a transaction screen received from a server, the transaction screen containing data for a transaction;
   waiting to receive user input to the transaction screen; and
   automatically refreshing the transaction screen on the client with updated data if user input to the transaction screen is not received by the server within a pre-determined period of time, wherein refreshing the transaction screen comprises:
      starting a timer that times out after a pre-determined period of time has lapsed;
      once the timer times out, simulating user input requesting that the transaction screen be refreshed, the simulating being performed by the server; and
      refreshing the transaction screen with updated data in response to the simulated user input.

4. The method of claim 3, wherein the server is a transaction processing application whose execution involves multiple phases including:
   a first phase that involves displaying a transaction screen;
   a second phase that involves waiting for user interaction with the transaction screen; and
   a third phase that involves processing user interaction with the transaction screen.

5. A system comprising:
   a server;
   a client, the client including:
      means for displaying on a display device of the client, a transaction screen received from the server, the transaction screen containing data for a transaction; and
   the server including:
      means for waiting to receive user input to the transaction screen; and
      means for automatically refreshing the transaction screen on the client with updated data if user input to the transaction screen is not received by the server within a pre-determined period of time, wherein the means for refreshing the transaction screen comprises:
         means for starting a timer that times out after a pre-determined period of time has lapsed;
         means for, once the timer times out, simulating user input requesting that the transaction screen be refreshed; and
         means for refreshing the transaction screen with updated data in response to the simulated user input.

6. The system of claim 5, wherein the server is a transaction processing system whose execution involves multiple phases including:
   a first phase that involves displaying a transaction screen;
   a second phase that involves waiting for user interaction with the transaction screen; and
   a third phase that involves processing user interaction with the transaction screen.

7. A computer program product, tangibly embodied in a machine-readable storage device, the computer program product being operable to cause data processing apparatus comprising a client and a server to perform operations comprising:
   displaying on a display device of the client, a transaction screen received from the server, the transaction screen containing data for a transaction;
   waiting to receive user input to the transaction screen; and
   if user input to the transaction screen is not received by the server within a pre-determined period of time, automatically refreshing the transaction screen on the client with updated data by simulating user input requesting that the transaction screen be refreshed, the simulating being performed by the server.

8. The product of claim 7, wherein simulating user input requesting that the transaction screen be refreshed comprises:
   starting a timer that times out after a pre-determined period of time has lapsed;
   once the timer times out, simulating user input requesting that the transaction screen be refreshed; and
   refreshing the transaction screen with updated data in response to the simulated user input.

9. The product of claim 7, wherein the server is a transaction processing application whose execution involves multiple phases including:
   a first phase that involves displaying a transaction screen;
   a second phase that involves waiting for user interaction with the transaction screen; and
   a third phase that involves processing user interaction with the transaction screen.

10. A method comprising:
   displaying on a display device of a client, a transaction screen received from a server, the transaction screen containing data for a transaction;
   waiting to receive user input to the transaction screen; and if user input to the transaction screen is not received by the server within a pre-determined period of time, automatically refreshing the transaction screen on the client with updated data by simulating user input requesting that the transaction screen be refreshed, the simulating being performed by the server.

11. The method of claim 10, wherein simulating user input requesting that the transaction screen be refreshed comprises:
    starting a timer that times out after a pre-determined period of time has lapsed;
    once the timer times out, simulating user input requesting that the transaction screen be refreshed; and
    refreshing the transaction screen with updated data in response to the simulated user input.

12. The method of claim 10, wherein the server is a transaction processing application whose execution involves multiple phases including:
    a first phase that involves displaying a transaction screen;
    a second phase that involves waiting for user interaction with the transaction screen; and
    a third phase that involves processing user interaction with the transaction screen.

13. A system comprising:
    a server;
    a client, the client including:
        means for displaying on a display device of the client, a transaction screen received from the server, the transaction screen containing data for a transaction; and
    the server including:
        means for waiting to receive user input to the transaction screen; and
        means for automatically refreshing the transaction screen on the client with updated data if user input to the transaction screen is not received by the server within a pre-determined period of time by simulating user input on the server requesting that the transaction screen be refreshed.

14. The system of claim 13, wherein the means for automatically refreshing the transaction screen if user input is not received within a pre-determined period of time comprises:
    means for starting a timer that times out after a pre-determined period of time has lapsed;
    means for, once the timer times out, simulating user input requesting that the transaction screen be refreshed; and
    means for refreshing the transaction screen with updated data in response to the simulated user input.

15. The system of claim 13, wherein the server is a transaction processing system whose execution involves multiple phases including:
    a first phase that involves displaying a transaction screen;
    a second phase that involves waiting for user interaction with the transaction screen; and
    a third phase that involves processing user interaction with the transaction screen.

* * * * *